United States Patent
Sambhy et al.

(10) Patent No.: US 12,247,356 B2
(45) Date of Patent: Mar. 11, 2025

(54) PAPER PRECOAT PROCESS

(71) Applicant: Xerox Corporation, Norwalk, CT (US)

(72) Inventors: Varun Sambhy, Pittsford, NY (US); Eliud Robles Flores, Rochester, NY (US); Douglas A. Gutberlet, Ontario, NY (US); Paul F. Sawicki, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 17/476,649

(22) Filed: Sep. 16, 2021

(65) Prior Publication Data

US 2023/0095967 A1 Mar. 30, 2023

(51) Int. Cl.
| | |
|---|---|
| *D21H 23/46* | (2006.01) |
| *B41M 5/00* | (2006.01) |
| *B41M 7/00* | (2006.01) |
| *D21C 5/02* | (2006.01) |
| *D21H 19/12* | (2006.01) |
| *D21H 23/50* | (2006.01) |

(52) U.S. Cl.
CPC .......... *D21H 23/46* (2013.01); *B41M 5/0011* (2013.01); *B41M 7/0009* (2013.01); *D21C 5/025* (2013.01); *D21H 19/12* (2013.01); *D21H 23/50* (2013.01)

(58) Field of Classification Search
None
See application file for complete search history.

(56) References Cited

U.S. PATENT DOCUMENTS

| | | | | |
|---|---|---|---|---|
| 5,897,961 | A * | 4/1999 | Malhotra | G03G 7/0026 428/32.22 |
| 2011/0104409 | A1 * | 5/2011 | Mittelstadt | B41M 5/506 427/419.8 |
| 2022/0034040 | A1 * | 2/2022 | Boswell | B32B 23/12 |

OTHER PUBLICATIONS

Tubbs, R.K., Sequence Distribution of Partially Hydrolyzed Poly(vinyl acetate), J. Polym. Sci. 1966, 4, 623-629.
Tacx, et al., Dissolution Behavior and Solution Properties of Polyvinylalcohol as Determined by Viscometry and Light Scattering in DMSO, Ethylene Glycol, and Water, Polymer 2000, 41, 947-957.
"Deinking" article available at the online encyclopedia Wikipedia, last edited Mar. 18, 2021.
"Paper Recycling" article available at the online encyclopedia Wikipedia, last edited Jul. 7, 2021.

* cited by examiner

*Primary Examiner* — Michael P. Rodriguez
(74) *Attorney, Agent, or Firm* — Marylou J. Lavoie, Esq.

(57) ABSTRACT

A process including providing a paper substrate; disposing a water soluble precoat composition onto all or a portion of the paper substrate to provide a treated paper; applying an image onto the treated paper using a toner or an aqueous ink to provide an imaged paper; wherein the water soluble precoat composition forms a temporary barrier between the toner or aqueous ink and the paper substrate; and wherein, during a paper pulping process, the water soluble precoat composition dissolves thereby releasing the toner or aqueous ink from the paper substrate.

23 Claims, 1 Drawing Sheet

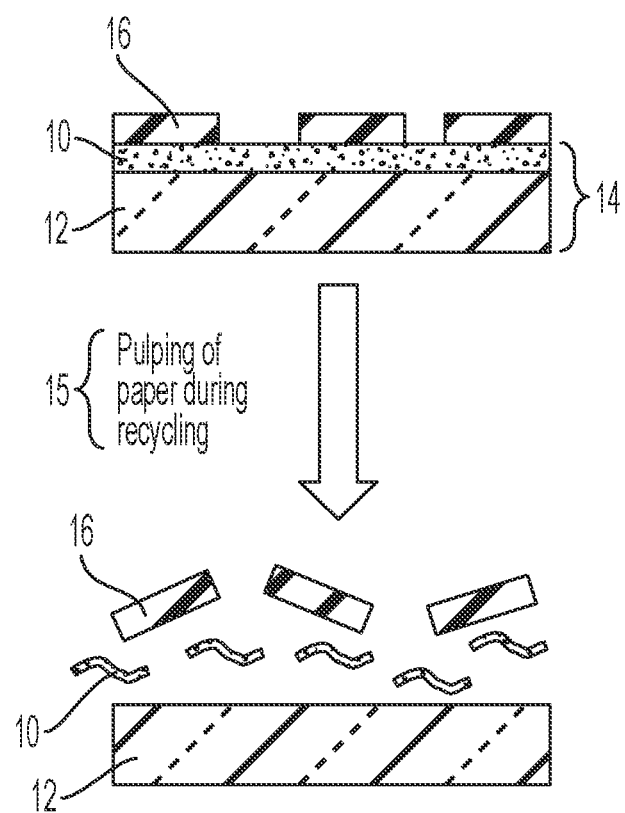

PAPER PRECOAT PROCESS

BACKGROUND

Disclosed herein is a process comprising: providing a paper substrate; disposing a water soluble precoat composition onto all or a portion of the paper substrate to provide a treated paper; applying an image onto the treated paper using a toner or an aqueous ink to provide an imaged paper; wherein the water soluble precoat composition forms a temporary barrier between the toner or aqueous ink and the paper substrate; and wherein, during a paper pulping process, the water soluble precoat composition dissolves thereby releasing the toner or aqueous ink from the paper substrate.

Change in consumer behavior and current and potential future government regulations are driving the printing industry to explore materials and processes that are green and environmentally friendly. Improving ease of printed paper recyclability is one way to reduce the environmental impact of printing.

One of the primary challenges in recycling printer paper, including toner as well as ink jet ink printed paper) is deinking; that is, removing polymer toner and ink from paper fibers. Typically, toners and inks are very strongly bonded to paper fibers and require energy intensive and harsh chemical processes to separate them from paper. Hence, any method that makes the deinking process simpler and reduces energy and chemical footprint is highly desirable.

Currently available paper recycling processes may be suitable for their intended purposes. However a need remains for improved paper recycling processes, particularly for improved processes that make paper deinking simpler.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a process comprising: providing a paper substrate; disposing a water soluble precoat composition onto all or a portion of the paper substrate to provide a treated paper; applying an image onto the treated paper using a toner or an aqueous ink to provide an imaged paper; wherein the water soluble precoat composition forms a temporary barrier between the toner or aqueous ink and the paper substrate; and wherein, during a paper pulping process, the water soluble precoat composition dissolves thereby releasing the toner or aqueous ink from the paper substrate.

Also described is a process comprising: providing a paper substrate; disposing a water soluble precoat composition onto all or a portion of the paper substrate to provide a treated paper; wherein the water soluble precoat composition comprises polyvinyl alcohol; applying an image onto the treated paper using a toner or an aqueous ink to provide an imaged paper; wherein the water soluble precoat composition forms a temporary barrier between the toner or aqueous ink and the paper substrate; wherein, during a paper pulping process, the water soluble precoat composition dissolves thereby releasing the toner or aqueous ink from the paper substrate; and wherein the paper pulping process comprises agitating the imaged paper with only water without other chemicals to provide pieces of paper pulp.

BRIEF DESCRIPTION OF THE DRAWINGS

The FIGURE is an illustration showing a precoat process in accordance with the present embodiments.

DETAILED DESCRIPTION

A paper precoat process that simplifies paper deinking is provided. A water soluble precoat is provided. The water soluble precoat dissolves away during the paper pulping process of recycling and thereby releases the toner or ink from the paper fibers without requiring use of harsh chemicals or requiring less energy and harsh chemicals than previous processes.

In embodiments, a water soluble polymer precoat is applied to paper media. Toner or aqueous ink is then printed on the treated paper. The water soluble precoat polymer forms a temporary barrier between the toner or ink and the paper fibers. The water soluble precoat dissolves away during the paper pulping process of recycling and releases the toner or ink from the paper fibers without need of harsh chemicals or large amounts of energy or with reduced need of energy and harsh chemicals. The process provides advantages including: easy paper recycling; less energy use to recycle printed paper; less chemical footprint to recycle printed paper. With the present process, better quality recycled paper is obtained as paper fibers do not break as much during the deinking process as less energy and chemicals are needed to deink the paper. A main concern about recycling wood pulp paper is that the fibers are degraded with each cycle and after being recycled several times, such as four to six times, the fibers become too short and weak to be useful in making paper. The present precoat process solves this problem.

The present precoat may also be tailored to improve print quality for aqueous ink jet inks, for example, by providing better spread and graininess.

Turning to the FIGURE, a paper precoat process in accordance with the present embodiments is illustrated. A water soluble precoat 10 is applied to paper media 12. The water soluble precoat 10 may be preapplied to the paper media 12 or applied inline, for example, jetted inline to form treated paper 14. Toner or aqueous ink 16 is then printed on the treated paper 14. The water soluble precoat polymer 10 forms a temporary barrier between the toner or ink 16 and the paper fibers of the paper 12. When desired, a paper pulping process for recycling the printed paper may be carried out. The water soluble precoat 10 dissolves away during the paper pulping process 15 and releases the toner or ink 16 from the paper fibers of the paper 12 without need for or with less need of energy and harsh chemicals.

A paper recycling process typically involves pulping, screening, centrifugal cleaning, deinking, refining and paper making. At the time of the pulping and flotation deinking process, chemicals are majorly used. Examples of a few chemicals which are used in the recycling paper process include surfactants and soaps, sodium hydroxide, chelating agents, sodium silicate, fatty acids, chlorine oxides and hydrogen peroxide. These chemicals play an important role in the paper recycling process to help agglomerate ink particles, act as a dispersant, as the pH buffering agent, as coagulation collectors to assist flotation process of ink, and for bleaching. Recycled pulp can be bleached (remove color) with chemicals. Chlorine oxides, hydrogen peroxide, and sodium hydrosulfite are the most common bleaching agents. Deinking paper more efficiently enables more efficient bleaching and less chemical use. Also deinking paper more efficiently enables more efficient de-attachment, agglomeration/coagulation, floatation, and removal of ink particles and less chemical use. Chemicals typically employed during the pulping process include caustic soda, hydrogen peroxide, and chelating agents. Chemicals typically employed during pH control steps include sodium silicate and sodium hydroxide. Deinking chemicals typically employed include nonionic surfactants, sodium silicate, and metal soaps. Chelating agents typically employed include fatty acids such as oleic acid and stearic acid. Chemicals typically employed for stickies control and removal include nonionic surfactants, cationic polyacrylamides, and polydiallyldimethyl ammonium chloride (DADMAC). Cleansing and degreasing chemicals include chlorinated and petroleum solvents.

Deinking is the industrial process of removing printing ink from paper fibers of recycled paper to make deinked pulp. The key in the deinking process is the ability to detach ink from the fibers. This is achieved by a combination of mechanical action and chemical means. A concern about recycling wood pulp paper is that the fibers are degraded with each cycle and after being recycled 4-6 times the fibers become too short and weak to be useful in making paper. Hence any process that enables more efficient and milder deinking will enable less degradation of paper fibers and more recycling cycles.

In embodiments, a process herein comprises providing a paper substrate; disposing a water soluble precoat composition onto all or a portion of the paper substrate to provide a treated paper; applying an image onto the treated paper using a toner or an aqueous ink to provide an imaged paper; wherein the water soluble precoat composition forms a temporary barrier between the toner or aqueous ink and the paper substrate; and wherein, during a paper pulping process, the water soluble precoat composition dissolves thereby releasing the toner or aqueous ink from the paper substrate. In other embodiments, a process herein comprises providing a paper substrate; disposing a water soluble precoat composition onto all or a portion of the paper substrate to provide a treated paper; wherein the water soluble precoat composition comprises polyvinyl alcohol; applying an image onto the treated paper using a toner or an aqueous ink to provide an imaged paper; wherein the water soluble precoat composition forms a temporary barrier between the toner or aqueous ink and the paper substrate; wherein, during a paper pulping process, the water soluble precoat composition dissolves thereby releasing the toner or aqueous ink from the paper substrate; and wherein the paper pulping process comprises agitating the imaged paper with only water without other chemicals to provide pieces of paper pulp.

The present precoat can comprise a water soluble polymer. In embodiments, polyvinyl alcohol can be selected for the precoat. Polyvinyl alcohol is an inexpensive water soluble polymer providing the advantage of low cost to the process. In embodiments, the polyvinyl alcohol can be tailored by modifying molecular weight, chemical side groups, or crosslinking. For example, the chemical side groups can be modified to affect the degree of hydrolysis. The water solubility of the precoat polymer can be tailored such that its properties are not changed at ambient humidity (so prints are stable and have long life), but such that the precoat polymer dissolves under pulping conditions of higher temperature and/or pH. Ambient temperature and humidity can vary depending on the location. Ambient temperature can be, for example from about 15° C. to about 30° C. or from about 15° C. to about 25° C. Humidity can be calculated in various ways. Relative humidity, often expressed as a percentage, indicates a present state of absolute humidity relative to a maximum humidity given the same temperature. Relative humidity, which expresses the amount of water vapor in the air as a percentage, is the most commonly used measure of humidity. Thus 0% means no water is present in the air, whereas at 100% dew begins to form. Humans can be comfortable within a wide range of humidities depending on the temperature such as from 30 to 70%. Below 20% is considered extremely low relative humidity and may cause eye irritation. As a general rule, 35-50% humidity is comfortable to people, and is a desirable range for most households and offices. Ambient humidity means not being immersed or dissolved in water in contrast to the pulping process. Ambient humidity can be, in embodiments, room ambient humidity, such as from about 20 to about 70%, or from about 30 to about 70% or from about 30 to about 50% relative humidity.

In embodiments, the water soluble precoat composition comprises a material that is stable at ambient humidity and dissolves under pulping conditions of higher temperature of above about 60° C. Pulping conditions including, for example, dissolving in water at a suitable temperature, such as a temperature of about 60° C., and, in embodiments, at an alkaline or basic pH.

The precoat process can be used in a similar way for toners and aqueous inks. Basically the toner and dried aqueous ink jet ink are similar at the end of printing in that both consist of polymers and pigments. The key factor is to enable a precoat that does not absorb too much water over the time thereby making the paper deink or have ink come off when the customer is using it. The precoat has to be soluble enough during the pulping process (alkaline pH's and high temperature) such that it dissolves to release the ink but not too much soluble under ambient humidity/temperatures or occasional water spills/wet hands use by customer so as to deink in customers hands. The prints should have good water fastness under consumer use ambient conditions. Polyvinyl alcohol (PVA) precoat can be easily modified to enable higher solubility during pulping conditions; that is alkaline pH and high temperature. For example, as with of Elmer's® glue for students-it typically doesn't dissolve as easily during ambient use, but if you soak it long enough it will dissolve and come off. Some of the ways to tailor water solubility of PVA and other polymers is to tailor the degree of hydrolysis, degree of crosslinking, copolymer ratio, and molecular weight.

Polyvinyl alcohol (PVA) has a hydroxyl group in its structure. It is synthesized by the polymerization of vinyl acetate to polyvinyl acetate (PVAc) which is then hydrolysed to get PVA. The structure of PVA is given below. The extent of hydrolysis and content of acetate groups in PVA affect the crytallizability and solubility of PVA.

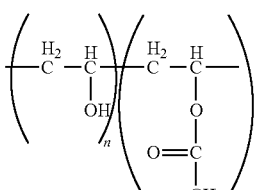

Partially Hydrolyzed PVA

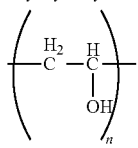

Fully Hydrolyzed PVA

For further information on solubility of PVA, see, for example, Tubbs, R. K., Sequence Distribution of Partially Hydrolyzed Poly(vinyl acetate). J. Polym. Sci. 1966, 4, 623-629, and Tacx, J. C. J. F.; Schoffeleers, H. M.; Brands, A. G. M.; Teuwen, L., Dissolution Behavior and Solution Properties of Polyvinylalcohol as Determined by Viscometry and Light Scattering in DMSO, Ethylene Glycol and Water, Polymer 2000, 41, 947-957.

The solubility of PVA in water depends on the degree of polymerization (DP), molecular weight, degree of hydrolysis, and solution temperature. Any change in these three factors affects the degree and character of hydrogen bonding in the aqueous solutions, and hence the solubility of PVA.

Polyvinyl alcohol (PVA) is the hydrolysis product of polyvinyl acetate. Depending on the hydrolysis conditions, there are fully hydrolyzed PVA and partially hydrolyzed PVA. Fully hydrolyzed PVA usually has a degree of hydrolysis (DS) of 98% to 99.8%, and can dissolve in water only at >80° C. The solubility of partially hydrolyzed PVA with a DS between 85% and 90% is dependent upon its molecular weight. PVA with high molecular weight needs to have high temperature for dissolving.

Hence by selecting PVA with proper degree of hydrolysis and molecular weight, we can tailor the precoat to dissolve and release the ink at higher specified temperature. So the prints would be stable under ambient temperature of customer use but the precoat would dissolve at higher temperature of pulping conditions, e.g. >60° C.

In embodiments, the water soluble precoat composition comprises a member of the group consisting of polyvinyl alcohol, polyvinyl pyrrolidone, polyacrylic acid, poly(ethylene glycol), polyacrylamides, polysaccharides such as starch or starch based derivatives, cellulose ethers such as hydroxypropylmethyl cellulose (HPMC), hydroxypropyl cellulose (HPC), hydroxyethyl cellulose (HEC), sodium carboxy methyl cellulose (Na-CMC), xanthan Gums, pectins, dextran, and combinations or copolymers thereof. In embodiments, the water soluble precoat composition comprises a member selected from the group consisting of polyvinyl alcohol, polyvinyl pyrrolidone, polyacrylic acid, poly(ethylene glycol), polyacrylamide, polysaccharide, cellulose ether and combinations thereof. In embodiments, the water soluble precoat composition comprises a member selected from the group consisting of starch, hydroxypropylmethyl cellulose, hydroxypropyl cellulose, hydroxyethyl cellulose, sodium carboxy methyl cellulose, xanthan gum, pectin, dextran, and combinations thereof.

In certain embodiments, the water soluble precoat is selected from a member of the group consisting of polyvinyl alcohol, polyvinyl pyrrolidone, polyacrylic acid, and poly (ethylene glycol). In a specific embodiment, the water soluble precoat composition is polyvinyl alcohol.

In embodiments, the water soluble precoat composition comprises a modified polyvinyl alcohol. In embodiments, the water soluble precoat composition comprises a PVA with degree of hydrolysis of about 90 to about 99% and a molecular weight between about 10,000 to about 100,000.

In embodiments, the water soluble precoat composition comprises a material that improves the spread and graininess of an aqueous ink jet ink.

The precoat can be applied to the paper by any suitable or desired method including flood coating, spray coating, or digitally ink jetting. In embodiments, the precoat is applied to the paper by in line flood coating or spray coating or digitally ink jetting to coat the whole paper or a portion of the paper substrate. In other embodiments, the precoat is applied, for example digitally jetted, only on areas that are going to receive ink. Thus, the precoat can be selectively applied to image receiving areas and areas of the paper that are not receiving toner or ink can be left uncoated.

Thus, in embodiments, disposing the water soluble precoat composition onto all or a portion of the paper substrate to provide a treated paper comprises in line flood coating the water soluble precoat composition onto all or a portion of the paper substrate. Flood coating is known to those skilled in the art.

In other embodiments, disposing the water soluble precoat composition onto all or a portion of the paper substrate to provide a treated paper comprises spray coating the water soluble precoat composition onto all or a portion of the paper substrate. Spray coating is known to those skilled in the art.

In other embodiments, disposing the water soluble precoat composition onto all or a portion of the paper substrate to provide a treated paper comprises digitally ink jetting the water soluble precoat composition onto all or a portion of the paper substrate. Ink jet printing/coating is known to those skilled in the art.

Optionally, the process further comprises drying the water soluble precoat composition after it is applied to the paper. In embodiments, the precoat requires minimum to no drying. For example, the percent solids or solvent may be tailored so that the precoat requires little or no drying. Drying can be accomplished by any suitable or desired method including air drying by allowing ambient air to dry the precoated paper, by applying an air blower to the precoated paper, or by subjecting the precoated paper to heat. Drying can be accomplished using a hot air blower, IR lamps, radiant heaters, or with no heater at all just by normal evaporation of solvent or blowing air using a fan.

An image can be applied to the treated paper using a toner or an aqueous ink to provide an imaged paper. Any suitable or desired toner can be employed. In embodiments, the toner can be Xerox® conventional pulverized toner or Xerox® emulsion Aggregation (EA) chemical toner. In other embodiments, the image can be created using an aqueous ink jet ink. Any suitable or desired aqueous ink jet ink can be selected, in embodiments, the aqueous ink jet ink can be Xerox® aqueous ink jet ink.

The image can be applied using any suitable or desired process. In embodiments, applying an image onto the treated paper comprises applying the image using a xerographic printing process. In other embodiments, applying an image onto the treated paper comprising applying the image using an ink jet printing process.

The present precoat process can be employed for enhancing paper recycling using standard methods of paper recycling as is known in the art. Typically, during the pulping process the paper is agitated with water and chemicals to convert the paper to smaller pieces/pulp. Deinking can comprise the process of removing printing ink or toner from paper fibers of recycled paper to make deinked pulp. An important factor in the deinking process is the ability to detach ink from the fibers. This is achieved by a combination of mechanical action and chemical means, most commonly using a froth flotation deinking process. See, for example, the article entitled "Deinking," available on the world wide web at the online encyclopedia Wikipedia, which article is hereby incorporated by reference herein in its entirety. See also, the article entitled "Paper Recycling," available on the world wide web at the online encyclopedia Wikipedia, which article is hereby incorporated by reference herein in its entirety.

Thus, in embodiments, the paper pulping process comprises agitating the imaged paper with water and optional chemicals to provide pieces of paper pulp. In embodiments, the paper pulping process comprises agitating the imaged paper with only water without chemicals to provide pieces of paper pulp.

In embodiments, the paper pulping process comprises agitating the imaged paper with water to provide pieces of paper pulp; and using a deinking process to separate the toner or aqueous ink from the paper pulp.

In embodiments, the toner or aqueous ink is removed from the imaged paper using less energy than prior methods requiring use of greater amounts of chemicals and/or greater amounts of energy.

Any suitable or desired paper substrate can be used for the process herein. In embodiments, the paper substrate is selected from a member of the group consisting of plain paper, offset paper, coated paper, uncoated paper, inkjet paper, among others. In a specific embodiment, the paper substrate comprises plain paper. In embodiments, plain paper is uncoated paper.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Prophetic Example. A precoat solution 1 is made by dissolving 95% hydrolyzed PVA (Average polymerization ~7000) in boiling water while stirring to yield a final concentration of PVA at 1 weight %. The precoat solution can be flood coated onto paper or can be sprayed onto the paper or can be applied to the paper using rollers such as metered anilox rollers or foam rollers or elastomeric rollers.

Example 2

Prophetic Example. A precoat solution 2 is made by dissolving 96% hydrolyzed PVA (Average polymerization ~10,000) in boiling water while stirring to yield a final concentration of PVA at 1 weight %. The precoat solution can be flood coated onto paper or can be sprayed onto the paper or can be applied to the paper using rollers such as metered anilox rollers or foam rollers or elastomeric rollers.

Example 3

Prophetic Example. A precoat solution 3 is made by dissolving 97% hydrolyzed PVA (Average polymerization ~5,000) in boiling water while stirring to yield a final concentration of PVA at 2 weight %. The precoat solution can be flood coated onto paper or can be sprayed onto the paper or can be applied to the paper using rollers such as metered anilox rollers or foam rollers or elastomeric rollers.

Example 4

Prophetic Example. A precoat solution 4 is made by dissolving 98% hydrolyzed PVA (Average polymerization ~3,000) in boiling water while stirring to yield a final concentration of PVA at 0.5 weight %. The precoat solution can be flood coated onto paper or can be sprayed onto the paper or can be applied to the paper using rollers such as metered anilox rollers or foam rollers or elastomeric rollers.

Example 5

Prophetic Example. A precoat solution 5 is made by dissolving 99% hydrolyzed PVA (Average polymerization ~15,000) in boiling water while stirring to yield a final concentration of PVA at 0.5 weight %. The precoat solution can be flood coated onto paper or can be sprayed onto the paper or can be applied to the paper using rollers such as metered anilox rollers or foam rollers or elastomeric rollers.

Example 6

Prophetic Example. A precoat solution 6 is made by dissolving 97% hydrolyzed PVA (Average polymerization ~20,000) in boiling water while stirring to yield a final concentration of PVA at 1 weight %. The precoat solution can be flood coated onto paper or can be sprayed onto the paper or can be applied to the paper using rollers such as metered anilox rollers or foam rollers or elastomeric rollers.

Example 7

Prophetic Example. A Xerox® plain paper is precoated with polyvinyl alcohol (polyvinyl alcohol from Kuraray Company) by spray coating (or flood coating) using a Kompac Technologies precoat machine. The precoated paper is then printed with Xerox® black toner using a Xerox® iGen®. The precoated printed paper can be recycled in the future using standard recycling processes.

Example 8

Prophetic Example. A Xerox® plain paper is precoated with polyvinyl alcohol (polyvinyl alcohol from Kuraray Company) by applying the polyvinyl alcohol inline in an ink jet printing process by jetting the polyvinyl alcohol on to the plain paper. The precoated paper is then printed with Xerox® aqueous ink using a Xerox® Baltoro™ HF. The precoated printed paper can be recycled in the future using standard recycling processes.

Example 9

Prophetic Example. A Xerox® plain paper is precoated with polyacrylic acid by spray coating (or flood coating)

using a Kompac Technologies precoat machine. The precoated paper is then printed with Xerox® black toner using a Xerox® iGen®. The precoated printed paper can be recycled in the future using standard recycling processes.

Thus a precoat for easy paper recycling is provided. The precoat provides advantages including: less energy use to recycle printed paper; less chemical footprint to recycle printed paper; better quality recycled paper obtained as paper fibers do not break as much during deinking process as less energy and chemicals are needed to deink paper.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process consisting of:
providing a paper substrate;
disposing a water soluble precoat composition onto a portion of the paper substrate to provide a treated paper;
applying an image onto the water soluble precoat composition using a toner or an aqueous ink to provide an imaged paper;
wherein the water soluble precoat composition forms a temporary barrier between the toner or aqueous ink and the paper substrate; and
wherein, during a paper pulping process, the water soluble precoat composition dissolves thereby releasing the toner or aqueous ink from the paper substrate.

2. The process of claim 1, wherein the water soluble precoat composition comprises a material that is stable at ambient humidity and dissolves under pulping conditions of higher temperature of above about 60° C.

3. The process of claim 1, wherein the water soluble precoat composition comprises a member selected from the group consisting of consisting of polyvinyl alcohol, polyvinyl pyrrolidone, polyacrylic acid, poly(ethylene glycol), polyacrylamide, polysaccharide, cellulose ether and combinations thereof.

4. The process of claim 1, wherein the water soluble precoat composition comprises a member selected from the group consisting of polyvinyl alcohol, polyvinyl pyrrolidone, polyacrylic acid, and poly(ethylene glycol).

5. The process of claim 1, wherein the water soluble precoat composition comprises polyvinyl alcohol.

6. The process of claim 1, wherein the water soluble precoat composition comprises a member selected from the group consisting of starch, hydroxypropylmethyl cellulose, hydroxypropyl cellulose, hydroxyethyl cellulose, sodium carboxy methyl cellulose, xanthan gum, pectin, dextran, and combinations thereof.

7. The process of claim 1, wherein the paper substrate comprises a member selected from the group consisting of plain paper, offset paper, coated paper, uncoated paper, and inkjet paper.

8. The process of claim 1, wherein the paper substrate comprises plain paper.

9. The process of claim 1, wherein applying an image onto the treated paper comprises applying the image using a xerographic printing process.

10. The process of claim 1, wherein applying an image onto the water soluble precoat composition comprises applying the image using an ink jet printing process.

11. The process of claim 1, wherein disposing the water soluble precoat composition onto a portion of the paper substrate to provide a treated paper comprises in line flood coating the water soluble precoat composition onto all or a portion of the paper substrate.

12. The process of claim 1, wherein disposing the water soluble precoat composition onto a portion of the paper substrate to provide a treated paper comprises spray coating the water soluble precoat composition onto a portion of the paper substrate.

13. The process of claim 1, wherein disposing the water soluble precoat composition onto a portion of the paper substrate to provide a treated paper comprises digitally ink jetting the water soluble precoat composition onto a portion of the paper substrate.

14. The process of claim 1, further comprising drying the applied water soluble precoat composition.

15. The process of claim 1, wherein the paper pulping process comprises agitating the imaged paper with water and optional chemicals to provide pieces of paper pulp.

16. The process of claim 1, wherein the paper pulping process comprises agitating the imaged paper with only water without other chemicals to provide pieces of paper pulp.

17. The process of claim 1, wherein the paper pulping process comprises agitating the imaged paper with water to provide pieces of paper pulp; and
using a deinking process to separate the toner or aqueous ink from the paper pulp.

18. A process consisting of:
providing a paper substrate;
disposing a water soluble precoat composition onto a portion of the paper substrate to provide a treated paper;
wherein the water soluble precoat composition comprises polyvinyl alcohol;
applying an image onto the water soluble precoat composition using a toner or an aqueous ink to provide an imaged paper;
wherein the water soluble precoat composition forms a temporary barrier between the toner or aqueous ink and the paper substrate;
wherein, during a paper pulping process, the water soluble precoat composition dissolves thereby releasing the toner or aqueous ink from the paper substrate; and
wherein the paper pulping process comprises agitating the imaged paper with only water without other chemicals to provide pieces of paper pulp.

19. The process of claim 18, wherein applying an image onto the water soluble precoat composition comprises applying the image using a xerographic printing process or an ink jet printing process.

20. The process of claim 18, wherein disposing the water soluble precoat composition onto a portion of the paper substrate to provide a treated paper comprises in line flood coating the water soluble precoat composition onto a portion of the paper substrate, spray coating the water soluble precoat composition onto a portion of the paper substrate, or ink jetting the water soluble precoat composition onto a portion of the paper substrate.

21. The process of claim 1, wherein disposing a water soluble precoat composition onto a portion of the paper substrate to provide a treated paper comprises selectively disposing the water soluble precoat composition onto image receiving areas of the paper substrate while leaving non-image receiving areas of the paper uncoated.

22. The process of claim 18, wherein disposing a water soluble precoat composition onto a portion of the paper substrate to provide a treated paper comprises selectively disposing the water soluble precoat composition onto image receiving areas of the paper substrate while leaving non-image receiving areas of the paper uncoated.

23. A process comprising:
   providing a paper substrate;
   disposing a water soluble precoat composition onto image receiving areas of the paper substrate to provide a treated paper;
   applying an image onto the water soluble precoat composition using a toner or an aqueous ink to provide an imaged paper;
   wherein the water soluble precoat composition forms a temporary barrier between the toner or aqueous ink and the paper substrate; and
   wherein, during a paper pulping process, the water soluble precoat composition dissolves thereby releasing the toner or aqueous ink from the paper substrate.

\* \* \* \* \*